May 25, 1965 J. M. HOLEMAN 3,185,022
OPTICAL GAGE FOR TESTING SURFACE IMPERFECTIONS
Filed June 15, 1961 2 Sheets-Sheet 1
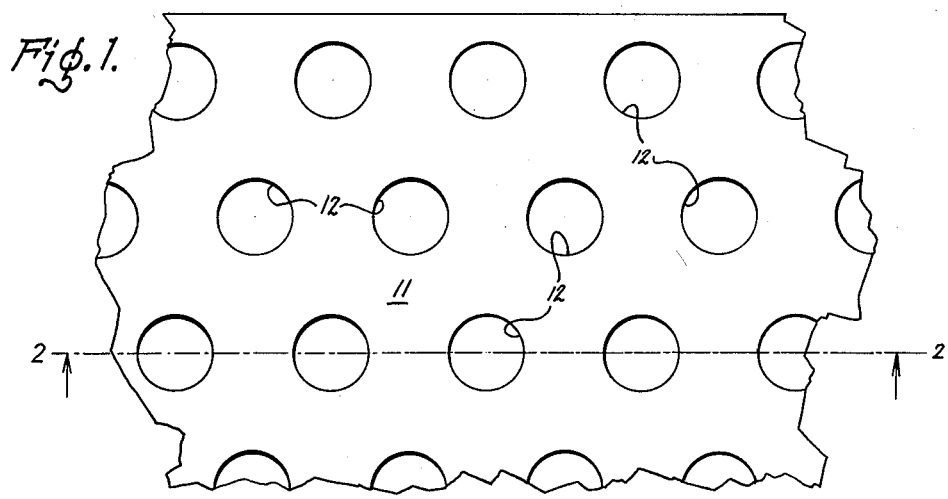
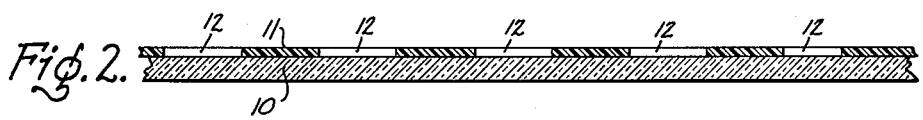
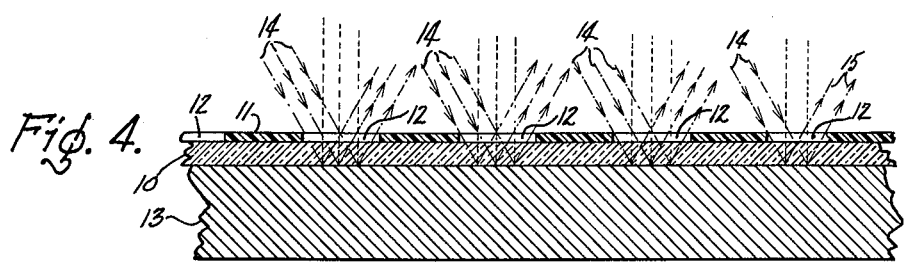
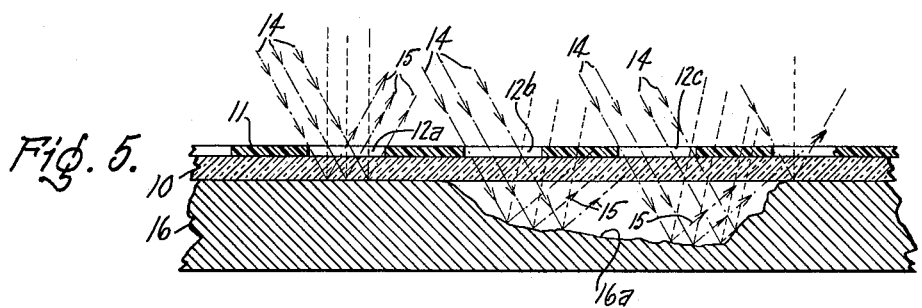
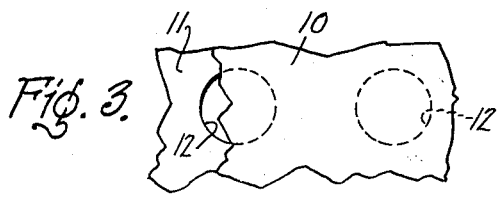
Inventor
John M. Holeman
by Paul G. Frank
His Attorney May 25, 1965  J. M. HOLEMAN  3,185,022
OPTICAL GAGE FOR TESTING SURFACE IMPERFECTIONS
Filed June 15, 1961  2 Sheets-Sheet 2
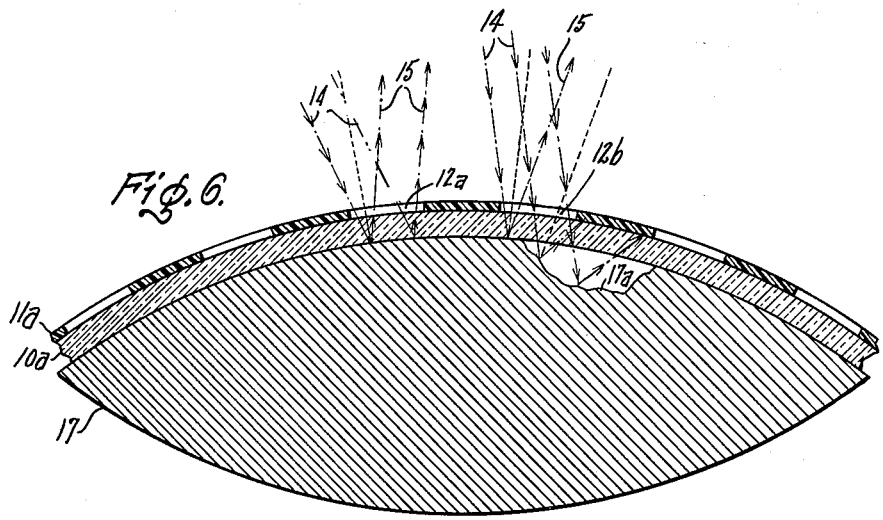
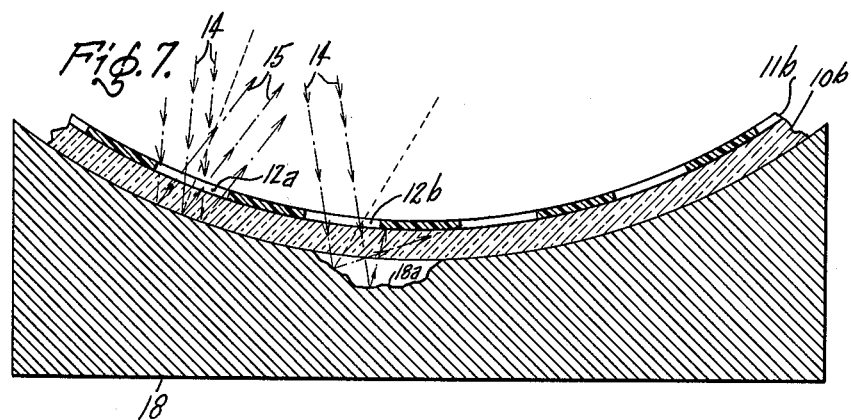
Inventor
John M. Holeman
by Paul A. Frank
His Attorney 3,185,022
OPTICAL GAGE FOR TESTING SURFACE
IMPERFECTIONS
John M. Holeman, Schenectady, N.Y., assignor to General
Electric Company, a corporation of New York
Filed June 15, 1961, Ser. No. 117,412
1 Claim. (Cl. 88—14)

This invention relates to optical testing gages and, more particularly, to such a gage for determining the flatness of a surface or its conformity toward a predetermined contour.

A known method of testing the optical flatness of a surface has been by the use of light interference. In that test, an optical flat is placed in contact with the surface to be measured and the adjoining surfaces of the two pieces are then viewed by reflected monochromatic light. If the test surfaces are not in true optical contact, interference fringes will be seen and the number of such fringes appearing in the area can be used to determine by how many wavelengths of light the surface of the piece being tested is out of true flatness. The light interference test has several disadvantages in that it requires a highly finished surface to produce fringes, it requires a monochromatic light source, and it requires the use of a high quality, expensive optical flat. In addition, the light interference test is extremely sensitive, with the maximum deviation in flatness that is easily measured being less than .0005 inch.

When measuring the correctness of the radius of a surface, such as on a lens, for example, it has been customary in the past merely to hold the lens with a metallic gage in contact with the surface and see if there is light visible between them. This test involves the danger that a higher polished glass surface, such as on a lens, may be damaged by contact with a metal.

Accordingly, it is the primary object of the present invention to provide an optical testing gage which obviates the disadvantages of the light interference test and the metallic gage test.

It is a further object of the present invention to provide an optical testing gage that may be made in various forms for checking either the planeness of a surface or the correctness of the curvature of a spherical surface.

It is a further object to provide such a testing gage that may be used to check any surface that will reflect light and does not require a highly finished surface on the piece being tested.

It is a still further object to provide an optical testing gage that does not require the services of a skilled technician to perform the test.

The foregoing objectives are achieved in accordance with this invention by providing an optical testing gage comprising a light transparent supporting member carrying a thin, opaque film having a plurality of apertures therein. The light transparent backing may be flat or may be formed with any desired contour. When the testing gage is placed on the surface whose flatness or contour is to be examined, and light is directed onto the gage, the light will be reflected from the surface through the same apertures through which it was incident if the surface is in close contact with the gage. If the surface is not in close contact with the gage, some or all of the reflected light will be intercepted by the opaque portions of the film and the apertures in that area will appear darker. Thus, in effect, a typographical map of the surface is produced in which imperfect areas appear dark and perfect areas appear light.

Further objects and advantages of the invention will become apparent from the following description, taken in conjunction with the accompanying drawings, in which
FIGURE 1 is a plan view of a portion of an optical testing device constructed in accordance with the invention;
FIGURE 2 is a sectional view taken on the lines 2—2 of FIGURE 1;
FIGURE 3 is a fragmentary bottom view of the gage shown in FIGURE 1 with a portion broken away;
FIGURE 4 is a sectional view similar to FIGURE 2 showing the device in use on a perfect plane test piece;
FIGURE 5 is a sectional view showing the device of the invention being used on an imperfect plane test piece;
FIGURE 6 is a sectional view showing the device being used on an imperfect convex surface; and
FIGURE 7 is a sectional view showing the testing device being used on an imperfect concave surface.

FIGURES 1, 2, and 3 illustrate in general form the optical gaging device of the invention, which comprises the light transparent supporting member 10 carrying a thin layer of opaque material 11 in which are provided a plurality of apertures or holes 12. It will be appreciated that in the drawings, the testing device is greatly enlarged in order to show its construction most clearly. In actual practice, the light transparent supporting member 10 may conveniently be made of thin glass and the opaque layer 11 may be photographic emulsion less than 0.001 inch thick with the holes 12 all being of the order of 0.01 inch in diameter. Preferably, the holes 12 are arranged as illustrated in hexagonal arrays spaced so that the distance separating any pair of adjacent holes is substantially equal to the diameter of the holes.

The operation of the testing device of the invention can best be understood from FIGURE 4, where the gage is shown being used to test the flatness of the upper surface of a test piece 13. The lower surface of the transparent base 10 of the gage is, of course, of the desired flatness against which the test piece is to be measured. In the case illustrated, the surface of the test piece 13 is flat and rays 14 from a light source (not shown) incident on the surface being tested through the holes 12 are all reflected at the same angle from the flat surface and pass out through the same holes through which they entered. Therefore, if the reflected rays 15 are viewed by an observer, all of the holes 12 appear evenly illuminated, which indicates that the surface of the test piece is substantially flat.

FIGURE 5 illustrates the testing gage of the invention being used to check the surface of a test piece 16 having a dimple or depression 16a in the surface. It is seen that the incident light 14 entering through the hole 12a onto a flat portion of the surface is returned through the same hole. However, light incident through the holes 12b and 12c is reflected from the irregular surface of the dimple 16a and, instead of returning through the same holes, strikes an opaque portion between the holes and may even be reflected through an adjacent hole. Thus, an observer viewing the reflected light 15 would see a dark area on the testing device corresponding to the position of the defect 16a.

FIGURES 6 and 7, respectively, illustrate the optical testing device of the invention being applied to test a convex surface and a concave surface. The gage may be formed to the desired contour for checking other than flat surfaces by grinding the transparent base from a blank or by forming it to the desired contour by the well-known optical manufacturing technique called "dropping." The "dropping" technique comprises heating the glass to a plastic condition and then dropping it onto a lap or mold having the desired configuration.

In FIGURE 6, the transparent base 10a of the testing device is formed to a shape complementary to that of the surface on a piece 17 to be tested, which has an irregularity or depression 17a therein. The operation of the gage is like that previously described in that light 14 is incident on the surface to be tested through the holes 12a and 12b formed in the opaque film 11a. As illustrated, the light incident through the hole 12a is reflected from an unblemished surface of the test piece and returns as reflected light 15 through the same hole that it entered. On the other hand, light incident through the hole 12b is reflected from the surface of the imperfection 17a and does not pass out through the hole 12b. Rather, it is intercepted by an opaque portion of the film 11a. Thus, an observer viewing the reflected light 15 would seek a dark area over the imperfection 17a.

Similarly, in FIGURE 7, a transport base 10b is formed to test a concave surface on a test piece 18 having an imperfection 18a in its surface. As in the embodiments previously described, incident light 14 passes through the openings 12a and 12b in the opaque area 11b and it is reflected from the surface to be tested. Light incident through the hole 12a is reflected back through the same hole through which it entered, whereas light incident through the hole 12b is reflected from the irregular surface of the imperfection 18a and does not return through the hole 12b. An observer viewing the reflected light 15 would once again see a dark spot on the testing gage in a position that corresponds to the imperfection 18a on the test piece.

It is now apparent that the optical testing device of the invention fulfills the stated objectives and provides a relatively inexpensive yet sensitive testing device. It is also apparent that various modifications in construction and arrangement and size of holes may be made by one skilled in the art. Therefore, the invention is to be defined only by the scope of the appended claim.

What I claim as new and desire to secure by Letters Patent of the United States is:

An optical testing gage comprising a light transparent supporting member formed to a shape complementary to that of the general configuration but not the discrete imperfections of a surface to be tested, and an opaque surface carried by said supporting member and having a plurality of regularly spaced light transmitting generally circular apertures formed therein, with adjacent apertures being separated by a distance substantially equal to their diameters and with such diameters being substantially equal whereby upon the gage being positioned over a surface to be tested and light being directed through the apertures, light striking unblemished portions of the test surface will be reflected back out through the apertures, and light striking imperfections in the test surface will be occluded by the opaque portions of the gage.

References Cited by the Examiner

UNITED STATES PATENTS

| 1,478,536 | 12/23 | Servais | 88—14 |
| 2,475,490 | 7/49 | Gelardin | 88—14 |
| 2,559,915 | 7/51 | Gaebel | 88—14 |
| 2,657,611 | 11/53 | Borth | 33—174 |
| 2,867,149 | 1/59 | Goddard | 88—14 |

JEWELL H. PEDERSEN, Primary Examiner.

EMIL G. ANDERSON, Examiner.